United States Patent [19]

Schwarz et al.

[11] Patent Number: 5,308,136
[45] Date of Patent: May 3, 1994

[54] SUN VISOR FOR MOTOR-POWERED VEHICLES

[75] Inventors: Gerhard Schwarz, Tamm; Hans-Georg Goletz, Bietigheim-Bissingen; Lothar Stoczek, Markgröningen, all of Fed. Rep. of Germany

[73] Assignee: Eugen Zipperle GmbH & Co., KG, Fed. Rep. of Germany

[21] Appl. No.: 962,653

[22] Filed: Oct. 19, 1992

[30] Foreign Application Priority Data

Jul. 8, 1992 [DE] Fed. Rep. of Germany ... 9209123[U]
Sep. 1, 1992 [EP] European Pat. Off. ......... 92114897.9

[51] Int. Cl.⁵ .............................................. B60J 3/00
[52] U.S. Cl. ................................. 296/97.1; 29/91.1
[58] Field of Search .................... 296/97.1; 29/91, 91.1

[56] References Cited

U.S. PATENT DOCUMENTS

| | | | |
|---|---|---|---|
| 3,619,879 | 11/1971 | Shirakawa | 29/91.1 |
| 3,827,748 | 8/1974 | Herr et al. | 296/97.1 |
| 3,871,703 | 3/1975 | Accatino | 296/97.1 |
| 4,576,409 | 3/1986 | Ebert | 296/97.1 |
| 5,221,120 | 6/1993 | Viertel et al. | 296/97.1 |
| 5,230,546 | 7/1993 | Smith et al. | 296/97.1 |

FOREIGN PATENT DOCUMENTS

| | | | |
|---|---|---|---|
| 0085877 | 8/1983 | European Pat. Off. | 296/97.1 |
| 0403846 | 12/1990 | European Pat. Off. | 296/97.1 |
| 2633002 | 2/1978 | Fed. Rep. of Germany | 296/97.1 |
| 2636057 | 3/1990 | France | 29/91 |
| 43022 | 4/1981 | Japan | 296/97.1 |

OTHER PUBLICATIONS

Modern Plastics Encyclopedia 1967, Published Sep. 1966, vol. 44 No. 1A. p. 348.
Modern Plastics Encyclopedia, 1991, Published Oct. 1990, vol. 67, No. 11, pp. 84 and 88.

Primary Examiner—Dennis H. Pedder
Attorney, Agent, or Firm—Wigman, Cohen, Leitner & Myers

[57] ABSTRACT

A visor shell is formed of two parts with a thin plastic sheet covering each part and another plastic sheet at the interface of the two parts.

13 Claims, 5 Drawing Sheets

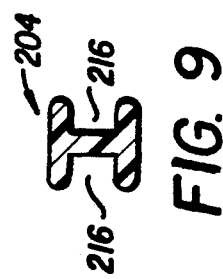
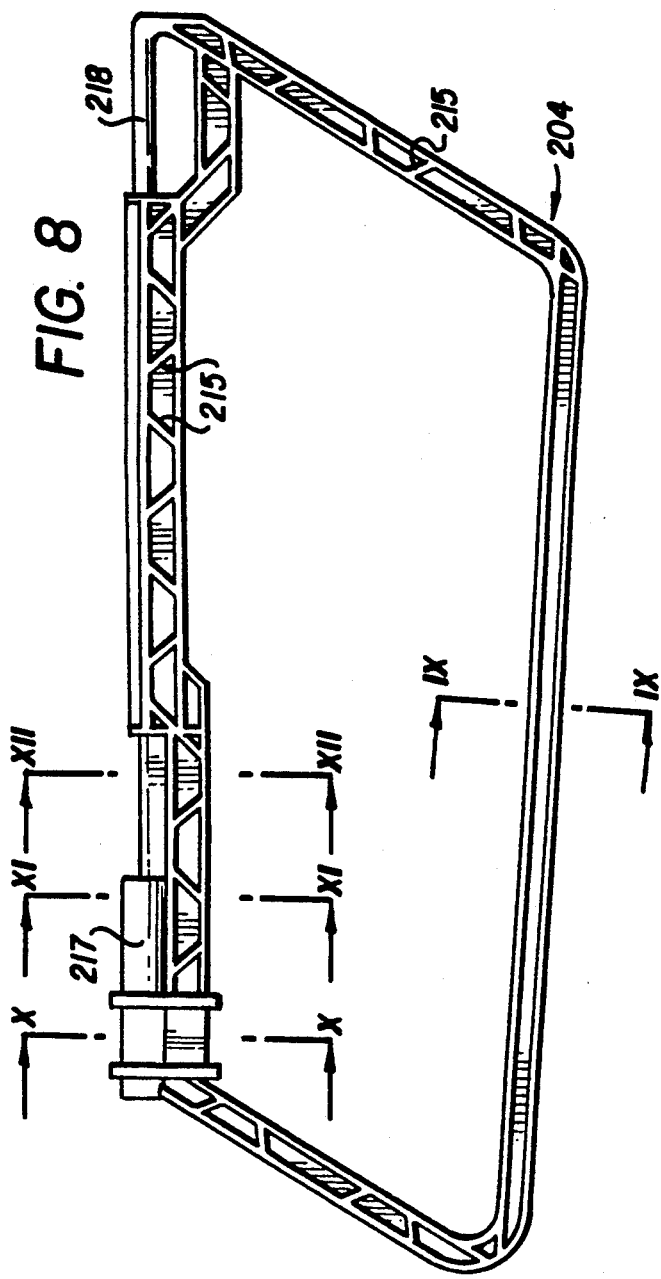
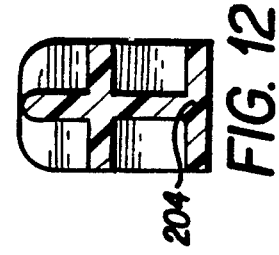
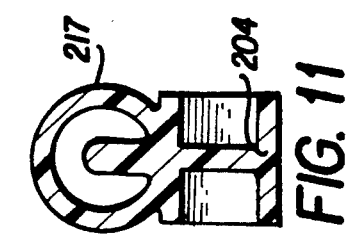
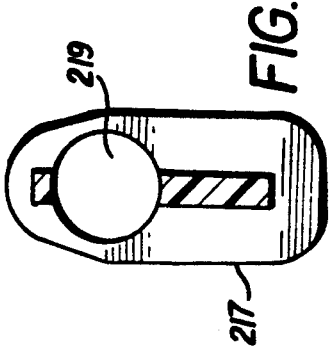

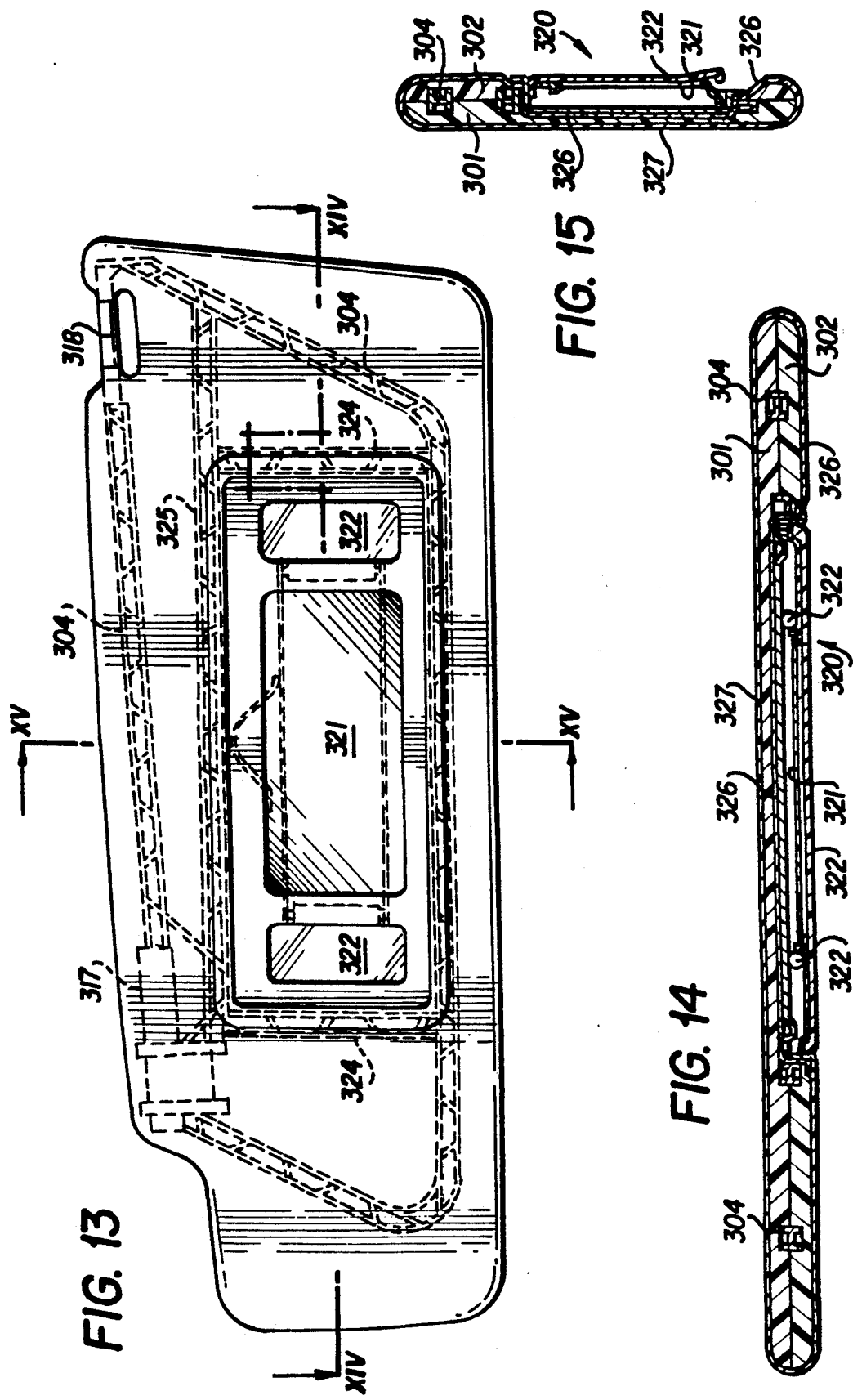

SUN VISOR FOR MOTOR-POWERED VEHICLES

BACKGROUND OF THE INVENTION

The invention relates to a sun visor for vehicles.

Conventional sun visors are constructed with a one piece visor body which include a metal wire surrounded by plastic foam which is subject to the stress of high temperature. For recycling, such inside frames must be broken down, so that the various materials ca be separated. It is disadvantageous that the visor bodies in known sun visors are of polyurethane foam.

OBJECTS AND SUMMARY OF THE INVENTION

A primary object of the invention is to provide an improved sun visor for vehicles. Other objects and advantages of the present invention will become apparent from the description which follows.

The improvements according to the invention are provided in the form of visor bodies which can be manufactured and recycled at low cost. Furthermore such a sun visor body can be produced with any desired covering material. Since the inside frame is to be inserted into the already produced and shaped parts of the sun visor, high temperature resistance is no longer necessary. The inside frame can therefore consist of recycleable plastic.

In one preferred embodiment the cover consists of two thin sheets of recycleable plastic, connected with one another by a welded seam along the partition joint of the visor body. By virtue of material accumulation in the area of the weld seam coming from an additional thin sheet engaging preferably between the two parts of the sun visor of the same material as the covering, a clean weld seam can be produced without difficulty, from which the thin sheet parts which hang over can be easily torn away.

Generally speaking the cover alone cannot hold the two parts of the sun visor together to the required degree. Accordingly, connection means are preferably provided which engage on the insides of the sun visor body parts and connect these parts to one another. This connection means can be formed of cooperating parts, for instance material parts of the two parts of the visor body which engage reciprocally in and behind one another. Connection means however can also be segments of the inside frame parts inserted into recesses of the two parts of the visor body, since either the recesses and/or the inside frame can be given a suitable shape for that purpose.

In one preferred embodiment the inside frame is made of polypropylene which can be recovered and reused. The inside frame is preferably configured of one piece serving as a reinforcement frame running at some distance from the edge of the visor body. Then it is especially advantageous if the reinforcement frame is configured of on piece together with the bearing parts required for pivotal bearing of the visor body. The advantage of this arrangement lies not only in the fact that even the bearing parts are recycleable, but also in the reduction of the manufacturing costs.

The inside frame preferably has an H-shaped profile, which opens upwards, based on the arrangement wherein both of the groove-like recesses in the parts of the visor body receive the inside frame. With such a profile, both high rigidity of the inside frame and also a narrow seat in the groove-like recesses, and with that a good connecting effect, can be attained. Of course such an inside frame can be reinforced where necessary by shaped ribs, which preferably are configured to be fitted into the channels of the inside frame which are receiving them.

The inside frame in turn can still be configured of one integral piece, if it is configured as an outside frame having an inside, rectangular frame, which defines a cutout in one part of the visor body and a recess turned toward this cutout in the other part of the visor body, whereby the space formed by the cutout and the recess together receives an inserted mirror. This mirror member can also incorporate a lighting element and a movable mirror cover. Such a lighting element can be added to the assembly at very low cost. Also, in order to be able to reuse the material of the visor body, the mirror need only be removed in its entirety from the visor body.

The thin sheet covering the part of the visor body incorporating the cutout, there serving as a cover, also engages on the walls limiting the space for receiving said inside frame.

The recesses in both parts of the visor body can be properly shaped by working the body in foam state. However they can also be shaped subsequent to the foaming by means of a heated stamp. Such a stamp allows for realization of shapes having very thin walls and considerable curvature, which is very advantageous particularly in the case of use of particulate foam.

BRIEF DESCRIPTION OF THE DRAWINGS

The invention is to be described hereinafter in greater detail relative to the exemplary embodiments shown in the drawing, wherein:

FIG. 8 is a view of the inside frame of the visor body of the third exemplary embodiment;

FIGS. 9 to 12 are transverse sections taken through the inside frame of FIG. 8 at different points;

FIG. 13 is an elevational view of a fourth exemplary embodiment of the present invention;

FIG. 14 is a horizontal section along line XIV—XIV of FIG. 13;

FIG. 15 is a vertical section along line XV—XV of FIG. 13;

DETAILED DESCRIPTION OF THE PREFERRED EMBODIMENTS

Figure 1:
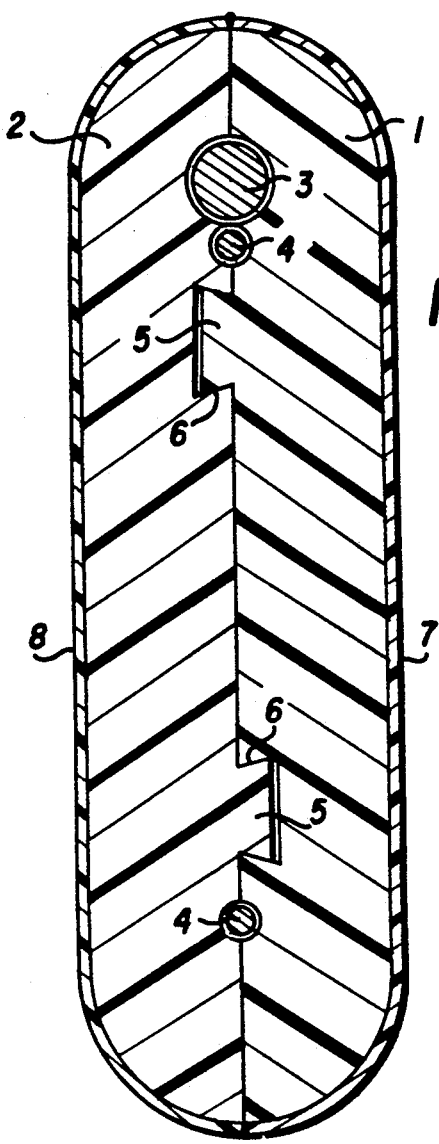
FIG. 1 is a transverse section through a first exemplary embodiment of the present invention.

Referring now to FIG. 1 there is shown a first exemplary embodiment of a vehicle sun visor which has a visor body comprising of a first part 1 and a second part 2, of which the shape and size correspond to the shape and size of conventional sun visors. As shown, the partition plane of the visor body lies in the mid-plane between the side turned toward the windshield when the sun visor is set to protect from the sun and the side turned away from the windshield.

Parts 1 and 2 of the visor body are preferably formed of particulate foam, generally of expanded polypropylene (EPP). Recesses are provided in the contact surface of each part which confronts the other part when in an assembled state to receive the swing-down bar or rod 3 and the bearings of rod 3 (not shown). An inside frame 4, which may be of metal or plastic, preferably of polypropylene, is also provided.

As shown in FIG. 1, parts 1 and 2 are furthermore provided with projecting tongues 5 which extend beyond the contact surfaces and have tapered-back sides, as well as with recesses 6 which are aligned to receive the projecting tongues 5 and are of a shape corresponding with the shape of tongues 5. With the assembly of the two parts 1 and 2 of the visor body, each projecting tongue 5 is thus aligned with one of the recesses 6, wherein projecting tongues 5 engage into recesses 6 with a click-catch. The joining in this manner requires no welds of any sort. Of course, it is possible to provide the projecting tongues on one part and all recesses 6 on the other part of the visor body. Furthermore, it is to be understood that the number of projecting tongues 5 and corresponding recesses 6 and their space arrangement can be varied, and the shapes themselves can be varied.

Following the joining of the two parts 1 and 2 of the visor body, between which lie swing-down, hinged bar 3 and inside frame 4, the visor body is provided with a covering, which in the exemplary embodiment consists of a thin plastic sheet. The covering is executed in such a manner that the first part 1 of the visor body is provided with a first part 7 of the covering and the second part 2 with a second part 8 of the covering. Then the two parts 7 and 8 are welded together along their aligned edges along the partition surface. The sheathing which is then formed of a covering material stands under a certain initial bias and as a result also supports the holding together of the two parts 1 and 2 of the visor body.

Figure 2:
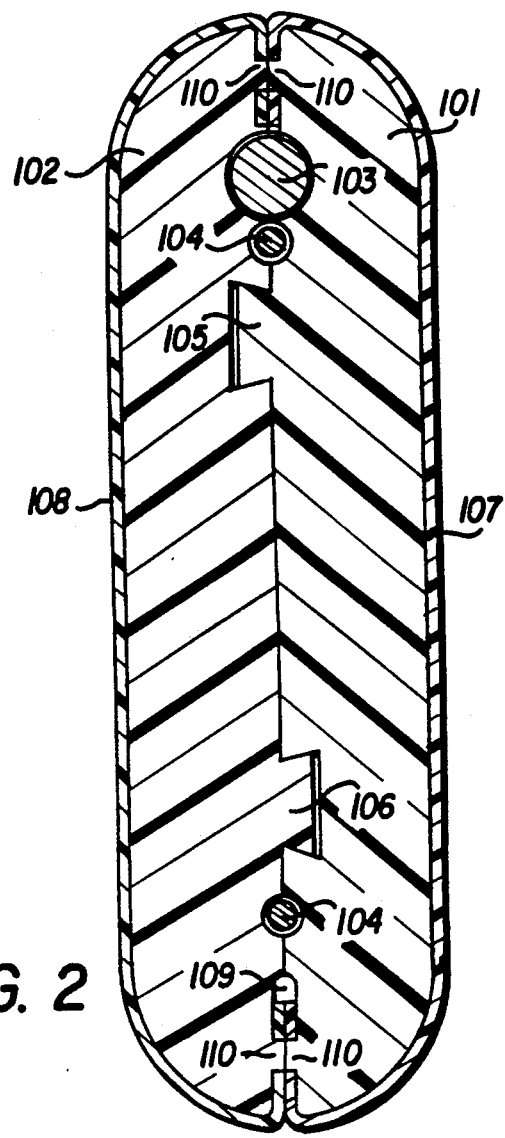
FIG. 2 is a transverse section through a second exemplary embodiment of the present invention.

The exemplary embodiment shown in FIG. 2 coincides for the most part with the first exemplary embodiment. Insofar as differences are present, these arise in that the two parts 107 and 108 of the covering are of a material, for instance a fabric or leather, which cannot be welded together to form a sheathing. In the description which follows, the second exemplary embodiment is described in detail only insofar as it differs from the first exemplary embodiment. Reference is made to the embodiment of FIG. 1 concerning the other individual features.

To receive the edge of the two parts 107 and 108 of the covering, which cover the parts 101 and 102 of the visor body consisting of particulate foam material, a clearance groove 109 is provided circumferentially in each surface of the partition plane along the outside edge. Groove 109 is of a dimension which is almost identical to twice the thickness of the covering material. Into this clearance groove 109 are fitted the edges of the two parts 107 and 108 of the covering material. In this edge zone the two parts 107 and 108 are provided with a plurality of punctures, which are punched out by projecting parts 110 and parts 101 and 102 of the visor body. Thus, as shown in FIG. 2, the projecting parts 110 of the one part 101 are aligned with those of the other part 102.

Following the manufacture and drying of the two parts 101 and 102 they ar covered with parts 107 and 108 of the covering material. The covering material can be held under a certain initial bias, since the projecting parts 110 hold the covering material securely. Finally the swing-down hinged axle 103 (and bearings) as well as the inside frame 104 are inserted between parts 101 and 102 and then these parts are joined together. Thus, the projecting tongues 105 penetrate into the recesses 106 associated with them, whereupon the two parts 101 and 102 are not only held in the correct position, but, on account of the tapered-back cuts, are also held in contact with one another. Finally, the projecting parts 110 are ultrasonically welded together. Of course, welds could also be arranged at other points, for instance in the area of projecting tongues 105 and recesses 106. The two parts 101 and 102 could also be adhesively joined, if desired.

The third exemplary embodiment of the sun visor according to the invention likewise has a visor body formed of two parts. Since these two parts are composed as identically constructed mirror-image half-shells, only half-shell 201 is represented and described.

Half-shell 201 consists of particulate foam, preferably, expanded polypropylene. The flat inside surface of half-shell 201 turned toward the other half-shell is provided with a groove-like recess, of which a segment 212 runs in the vicinity of the bottom edge of half-shell 201. Both segments 213 at the sides are contiguous therewith and run at a tight angle to the adjacent edges and extend as far as a segment 214 running essentially parallel to segment 212. Segment 214 has nonuniform shape, as can be seen in FIGS. 4 to 7, which show the two segments 212 and 214 at different points in cross section.

The groove-like recess of half-shell 201, formed by segments 212 to 214 and the corresponding groove-like recess of the other half-shell each form half of a reinforcement frame 204 of polypropylene configured as one single piece, which, as shown in FIG. 9, has an H-shaped transverse section profile, and the sides engaging in cuts 213 and 214 are additionally reinforced by shaped crosspieces 215, which lie in the grooves 216 formed in reinforcement frame 204.

With the sides of reinforcement frame 204 coming to lie in segment 214 of the two recesses in the form of annular grooves, a bearing body 217 and a transverse strut 218 are of one piece. Bearing body 217 forms a bearing bore 219 for the not shown main axle, around which the sun visor is pivoted from its non-use position into the position of use, and vice versa. Transverse strut 218 is aligned with this bearing bore 219 and, as is known, can be inserted removably into an auxilliary bearing.

The seat of reinforcement frame 204 in the two groove-like recesses of the half-shells receiving it is selected to be sufficiently narrow that an adequately secure hold is guaranteed.

In the exemplary embodiment, between the two half-shells is inserted not only reinforcement frame 204 but also a thin polypropylene sheet, so that it protrudes out of the partition joint. Since this sheet is very thin, it can extend over the entire inside surface of half-shell 201. Thus, it also lies in the groove-like recess of the one half-shell. However it is also possible to use a frame-like sheet. After the two half-shells have been joined together with insertion of reinforcement frame 204 and the thin polypropylene sheet, the visor body is placed between two more thin polypropylene sheets. These are then welded together with the thin sheets lying between the half-shells along the partition joint between two electrodes. Of course care must be taken that the two thin sheets receiving the visor body between them engage tightly and without creases on the half-shells. By virtue of the material accumulation in the area of the weld seam, resulting from the inserted sheet, an adequate, continuous weld seam can be produced, and a certain quantity of the material is forced into the partition joint. Following the weld process the overhanging border area can be torn off along the weld seam. The weld seam then has a smooth line. It is also smooth because the material forced into the partition joint does not overhang.

The exemplary embodiment of FIGS. 13 to 17 differs from that of FIGS. 3 to 12 only in terms of the features connected with an inserted member indicated in its entirety as 320, which includes a mirror 321 and lighting units 322 to the right and left of the mirror. Also, inserted member 320 has a pivotal mirror cover 322 pivoting around an axis located above the mirror, and consists of polypropylene, the same as the housing-like, supporting structure of the inserted member.

To receive inserted member 320 the one half-shell 301 is provided on the side turned toward the other half-shell 302 with a rectangular recess, of which the depth corresponds to approximately half the thickness of insert 320. The other half-shell 302 is provided with a aperture which coincides with the recess of half-shell 301. Both half-shells 301 and 302 consist of EPP particulate foam. The same as the recesses receiving reinforcement frame 304, both the recess and the aperture are likewise formed during manufacture of the half-shells.

As shown in FIG. 13, the segment of reinforcement frame 304 running parallel to the bottom edge of the visor body limits both the recess in the one half-shell 301 and also the aperture in the other half-shell 302 to this edge. On the side the recess and the aperture are limited by sides 324 configured of one single piece with the reinforcement frame 204, and sides 324 the same as the other parts of reinforcement frame 304 have an H-shaped transverse section profile with crosspieces 215 configured as reinforcement ribs. Also the top edge of the recesses of half-shell 301 and of the aperture in half-shell 302 is limited by an additional side 325 of reinforcement frame 304. This additional side 325 is constructed of one piece with the bearing body 317 or with the side of the reinforcement frame 304 contiguous with transverse strut 318 in the area of its ends.

As shown in FIGS. 14 and 15, the additional sides 324 and 325 of reinforcement frame 204 also lie in groove-like recesses of the two half-shells 301 and 302 and there, the same as reinforcement frame 304, form connecting elements which connect the two half-shells 301 and 302 without any play. Furthermore FIGS. 14 and 15 show that the thin sheet 326 covering half-shell 302 lines the recess in half-shell 301 and the side walls of the aperture in half-shell 302. Thin sheet 326 therefore covers half-shell 302 without interruption. It consists of polypropylene, as does thin sheet 327 covering half shell 301.

Figure 16:
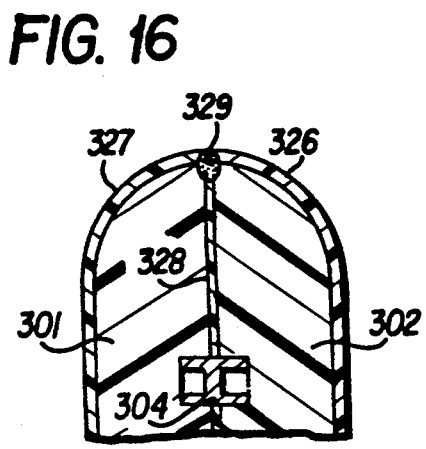
FIG. 16 is an enlarged portion of the upper part of FIG. 15.
Figure 17:
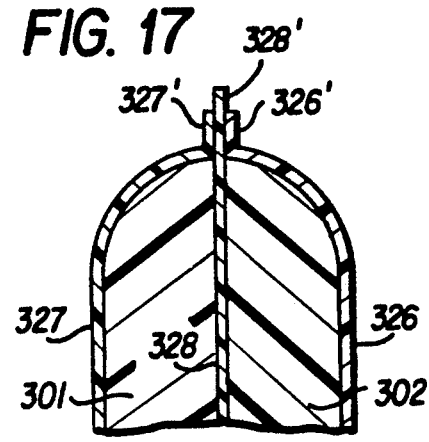
FIG. 17 is an enlarged section corresponding to that of FIG. 16 before welding the thin sheets together.
Figure 3:
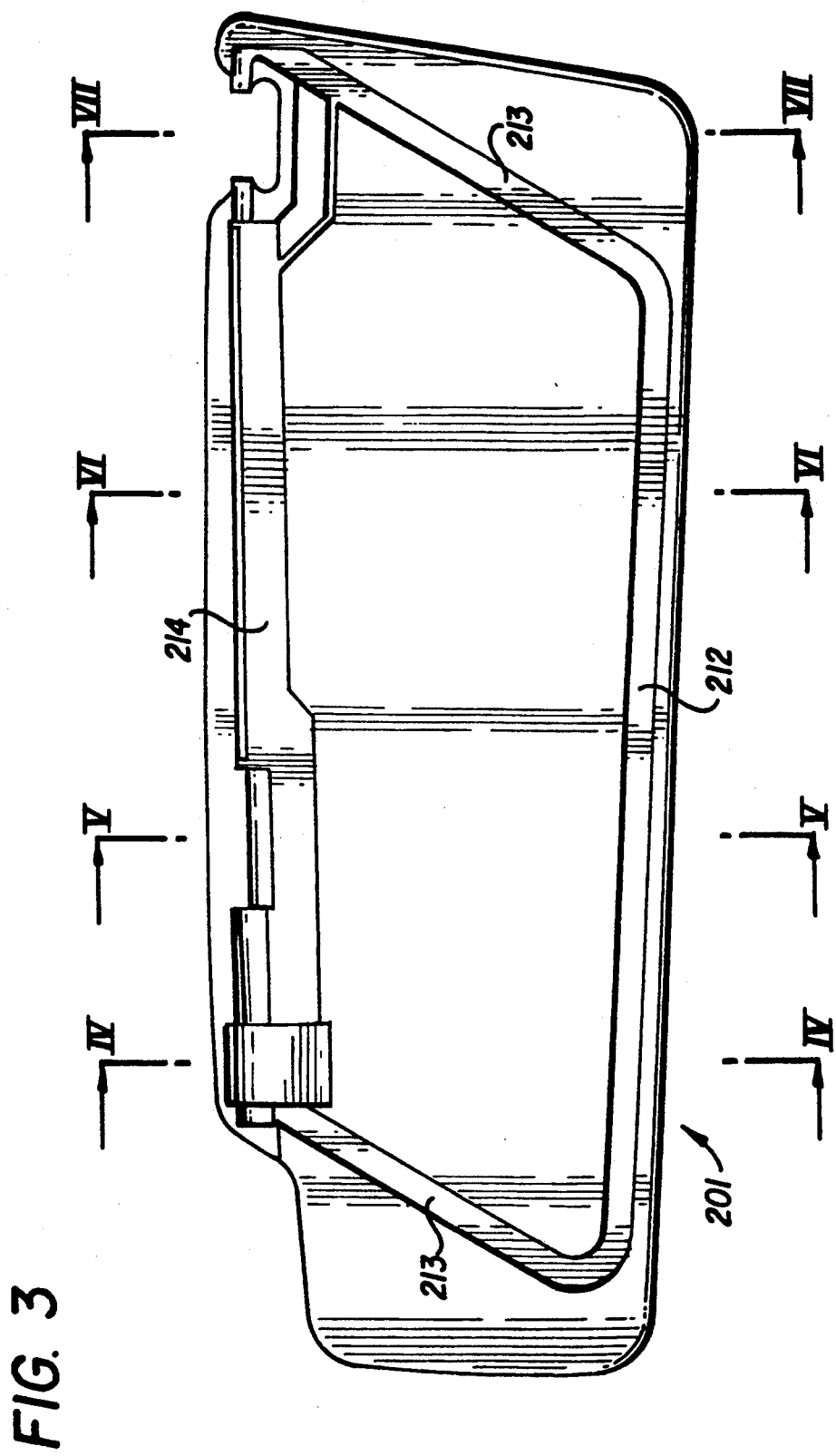
FIG. 3 is an elevational view of the inside of a half-shell of the visor body of a third exemplary embodiment of the present invention.
Figure 4:
FIGS. 4 to 7 are sections taken through successive parts of the visor body shown in FIG. 3
Figure 5:
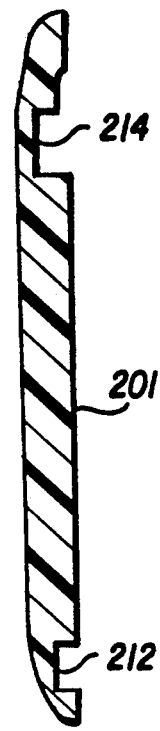
Figure 6:
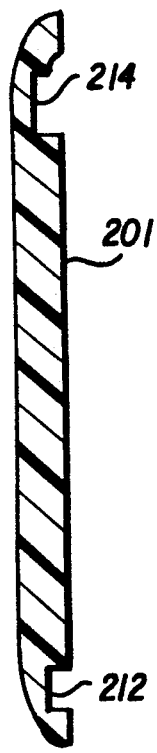
Figure 7:
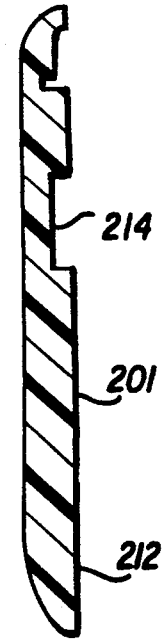

In order to be able to weld the two thin sheets 326 and 327 together along the partition joint of the visor body without any problems, as represented only in FIGS. 16 and 17, a third thin polypropylene sheet 328 is inserted between the two half shells 301 and 302, which then overhangs to the outside. This overhanging strip is indicated as 328'. It lies in front of the welding between the overhanging edge strips 326' and 327' of the two thin sheets 326 and 327. The third thin sheet 328 need not extend over the entire inside surface of the two half-shells 301 and 302. It suffices if it lies between their border areas. If now the three thin sheets are welded together by means of electrodes along the separation joint of the visor body, then by virtue of the material accumulation conditioned by the third thin sheet 328 a satisfactory weld seam 329 is attained. With the welding process as shown in FIG. 16, a part of the material is forced into the separating joint. Weld seam 329 is then practically not overhanging at all. The overhanging border strips 326', 327' and 328' can be torn off without any problem along weld seam 329.

Following the welding of thin sheets 326 and 327, insert 320 then needs simply to be inserted, and for this can be provided with catch elements projecting out on the sides, which cooperate with the sides 324 and hold inserted member 320 securely. The electric connection of lighting units 322 occurs either through cables or through electrically conductive foils or areas in such foils.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. Sun visor for motor-powered vehicles comprising a visor body formed of two parts which are arranged about a partition plane which is located between two outer surface sides of the sun visor, one outer surface side turned toward the windshield and one outer surface side turned away from the windshield when the sum visor is positioned for use, an inside frame positioned between the two parts of the visor body; and a covering over the visor body, said two parts of the visor body being formed of a plastic, said covering including two thin sheets of plastic which are formed together along a partition joint of the visor body by a weld seam, and a thin sheet disposed between the two parts of the visor body and made of the same material as the covering to provide material accumulation in the area of the weld seam.

2. Sun visor as in claim 1, wherein the two parts of the visor body are joined with one another by connection means.

3. Sun visor as in claim 2, wherein the connection means are formed by the cooperation of material parts of the two parts of the visor body.

4. Sun visor as in claim 3, wherein the two parts include a recess and the connection means are formed at least partially by segments of the inside frame inserted in the recesses of the two parts of the visor body.

5. Sun visor as in claim 4, wherein the inside frame is formed of a plastic.

6. Sun visor as in claim 5, wherein the inside frame is constructed of one piece to reinforce the visor body.

7. Sun visor as in claim 6, wherein the inside frame includes means for the pivotal bearing of the visor body.

8. Sun visor as in claim 7, wherein the inside frame has an H-profile in cross-section, so that the recesses of the two parts of the visor body can receive the inside frame.

9. Sun visor as in claim 8, wherein at least one segment of the inside frame has ribs formed in channels of the H-profile, which ribs are configured in one piece with the material parts limiting the channels.

10. Sun visor as in claim 9, wherein the inside frame has a further rectangular inside frame within, configured in one piece with it, and the further inside frame limits a cutout of one part of the visor body and a recess turned toward this cutout in the other part of the visor body, and that into the recess and the cutout is inserted the further inside frame with a mirror.

11. Sun visor as in claim 9, further including a lighting device in the inside frame.

12. Sun visor as in claim 10, wherein the thin covering sheet covering the part of the visor body incorporating the cutout engages on limiting walls of the cutout and recess.

13. Sun visor as in claim 5, wherein the inside frame is formed of polypropylene plastic.

* * * * *